United States Patent
Eguchi

(10) Patent No.: US 9,599,960 B2
(45) Date of Patent: Mar. 21, 2017

(54) DIGITAL HOLOGRAPHY THREE-DIMENSIONAL IMAGING APPARATUS AND DIGITAL HOLOGRAPHY THREE-DIMENSIONAL IMAGING METHOD

(71) Applicant: CANON KABUSHIKI KAISHA, Tokyo (JP)

(72) Inventor: Akira Eguchi, Tucson, AZ (US)

(73) Assignee: CANON KABUSHIKI KAISHA, Tokyo (JP)

( * ) Notice: Subject to any disclaimer, the term of this patent is extended or adjusted under 35 U.S.C. 154(b) by 78 days.

(21) Appl. No.: 14/567,436

(22) Filed: Dec. 11, 2014

(65) Prior Publication Data

US 2015/0176966 A1    Jun. 25, 2015

(30) Foreign Application Priority Data

Dec. 19, 2013  (JP) .................... 2013-261940

(51) Int. Cl.
*G01B 9/021* (2006.01)
*G03H 1/04* (2006.01)

(52) U.S. Cl.
CPC ..... *G03H 1/0443* (2013.01); *G03H 2001/046* (2013.01); *G03H 2001/0456* (2013.01);
(Continued)

(58) Field of Classification Search
CPC ..... G03H 2001/046; G03H 2001/0471; G03H 2210/62; G03H 2222/42; G03H 2222/44; G03H 2223/14
(Continued)

(56) References Cited

U.S. PATENT DOCUMENTS 3,877,776 A * 4/1975 Okino ............... G03H 1/32
                                             359/10
8,687,253 B2   4/2014 Yu et al.
(Continued)

FOREIGN PATENT DOCUMENTS

JP    2013-178484 A    9/2013
JP    2013-231716 A    11/2013

OTHER PUBLICATIONS

Park et al Speckle-field digital holographic microscopy, Optics Express, vol. 17, No. 15, Jul. 2009.*
(Continued)

*Primary Examiner* — Tarifur Chowdhury
*Assistant Examiner* — Jonathon Cook
(74) *Attorney, Agent, or Firm* — Rossi, Kimms & McDowell LLP

(57) ABSTRACT

The imaging apparatus includes an optical system dividing light into object and reference beams and causing the object beam and the reference beam to interfere with each other to form interference fringes on an image sensor. A processor performs multiple imaging processes for the interference fringes with different incident angles of the object beam to an object, a first process to acquire a transmitted wavefront for each incident angle and a second process to calculate a three-dimensional refractive index distribution from the transmitted wavefronts. The apparatus includes a modulator changing a phase distribution of light in any one of an optical path from a light source to a dividing element, a reference beam path and an optical path from a combining element to the image sensor and causes the modulator to change the phase distribution in at least one of the multiple imaging processes.

9 Claims, 9 Drawing Sheets

(52) U.S. Cl.
CPC . *G03H 2001/0471* (2013.01); *G03H 2210/62* (2013.01); *G03H 2222/42* (2013.01); *G03H 2222/44* (2013.01); *G03H 2223/14* (2013.01)

(58) Field of Classification Search
USPC .......................................................... 356/457
See application file for complete search history.

(56) References Cited

U.S. PATENT DOCUMENTS

| | | | |
|---|---|---|---|
| 8,896,840 B2 | 11/2014 | Matsubara et al. | |
| 2013/0148182 A1* | 6/2013 | Yu ........................ | G03H 1/0443 359/22 |
| 2013/0286403 A1* | 10/2013 | Matsubara ........... | G01N 21/453 356/457 |
| 2015/0205260 A1* | 7/2015 | Awatsuji .............. | G03H 1/0866 348/40 |

OTHER PUBLICATIONS

Depeursinge et al. "Digital Holography Applied to Microscopy", Proceedings of SPIE vol. 4659, Practical Holography XVI and Holographic Materials VIII, 30, Jun. 3, 2002, pp. 30-34, U.S.A.
Fang-Yen et al. "Video-rate tomographic phase microscopy", Journal of Biomedical Optics, vol. 16(1), Jan. 14, 2011, pp. 011005-1 to 011005-5, U.S.A.
Goodman, "Optical Methods for Suppressing Speckle", Chapter 5, in Speckle Phenomena in Optics, Roberts & Co., Publishers, U.S.A. (2007), pp. 141-186.

\* cited by examiner

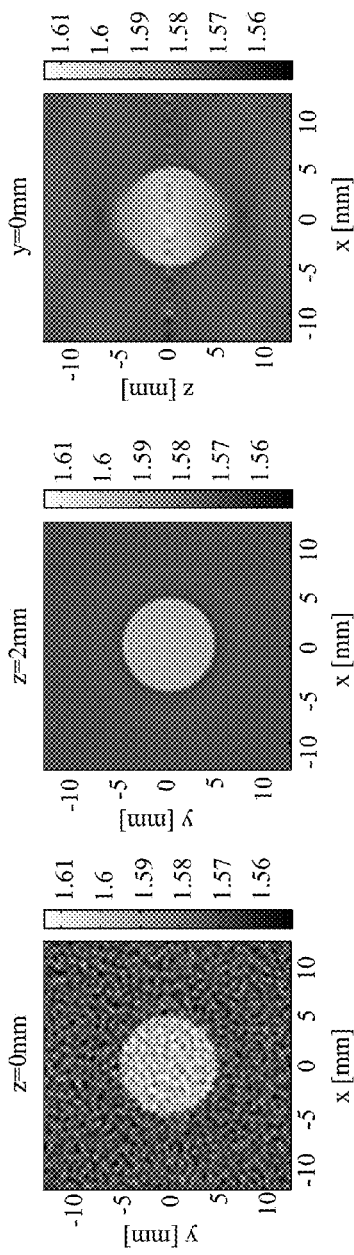
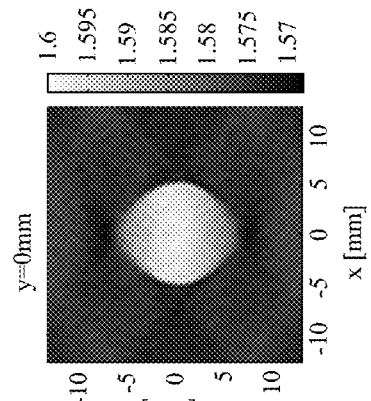
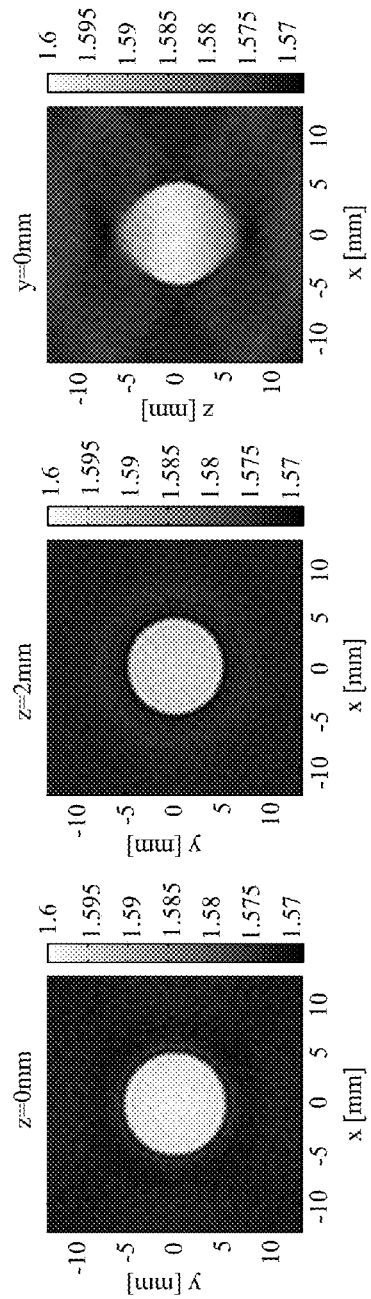

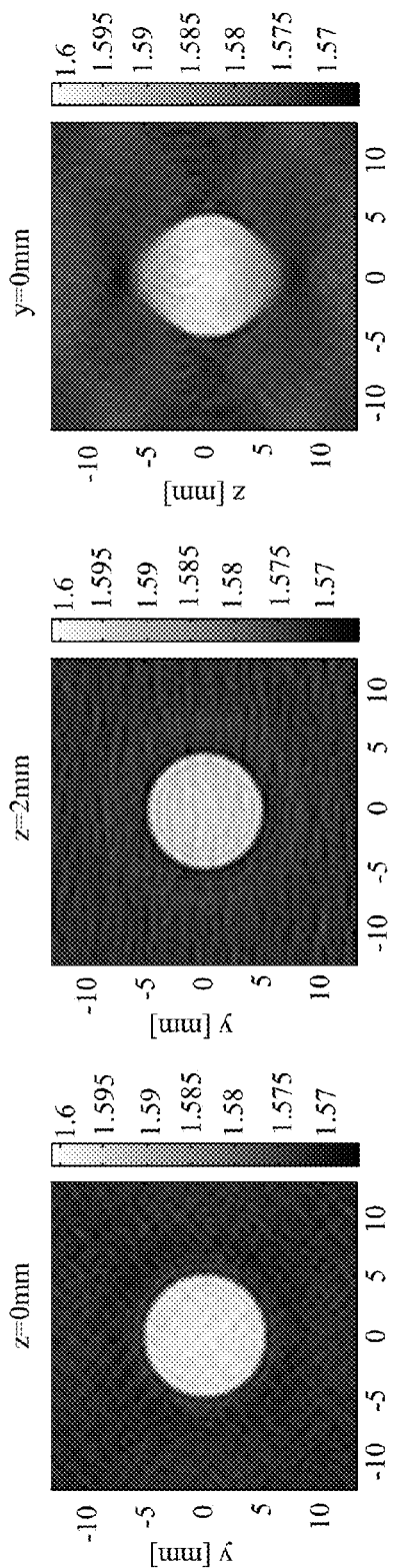

DIGITAL HOLOGRAPHY THREE-DIMENSIONAL IMAGING APPARATUS AND DIGITAL HOLOGRAPHY THREE-DIMENSIONAL IMAGING METHOD

BACKGROUND OF THE INVENTION

Field of the Invention

The present invention relates to a three-dimensional imaging apparatus using digital holography, such as a microscope device.

Description of the Related Art

In fields of medicine, biology and the like, as a method of observing a non-dyed biological object sample through a microscope device, C. D. Depeursinge, E. Cuche, P. Marquet, T. Colomb, P. Dahlgren, A. M. Marian, F. Montfort and P. J. Magistretti, "Digital Holography Applied to Microscopy" (Proceedings of SPIE, Vol. 4659, Practical Holography XVI and Holographic Materials VIII, pp. 30-34, Jun. 3, 2002, U.S.A.) discloses a method of utilizing digital holography.

The digital holography is a method of acquiring, through an image sensor, a digital signal corresponding to interference fringes generated by interference with a transmitted light transmitted through a sample and a reference beam and of calculating a wavefront of the transmitted light through a process performed by a processor 200 on the digital signal.

This method can quantitatively calculate a phase change of the wavefront caused by the sample, which enables observation of a non-dyed sample with high contrast.

On the other hand, biological object samples generally have a complicated three-dimensional structure, and observers such as medical doctors perform disease diagnosis on a basis of the three-dimensional solid structure.

Since a three-dimensional arrangement of cells is irregular, particularly in cancer, it is necessary to recognize this three-dimensional structure quickly in order to perform quick diagnosis.

Therefore, it is desired to acquire three-dimensional information of a sample and clearly provide the information to an observer.

Moreover, C. Fang-Yen, W. Choi, Y. Sung, C. J. Holbrow, R. R. Dasari, M. S. Feld, "Video-rate tomographic phase microscopy" (Journal of Biomedical Optics, Vol. 16(1), pp. 011005-1 to 011005-5, 14 Jan., 2011, U.S.A), which is hereinafter abbreviated as Literature A, discloses a three-dimensional imaging method of acquiring a three-dimensional refractive index distribution of a sample by performing a reconstruction process on multiple images of interference fringes produced through an image sensor; the images are produced by illuminating the sample with object beams whose incident angles to the sample are mutually different.

Interference fringes are normally generated by using light with high coherence, such as laser.

However, the light with high coherence generates a random phase distribution due to defects of an optical element through which this light passes and due to surface coarseness of the optical element, which changes an originally uniform illuminance distribution into a nonuniform illuminance distribution.

Such a nonuniform illuminance distribution is called speckle or speckle noise, which causes image degradation.

As a method of reducing the speckle noise, J. W. Goodman, "Speckle Phenomena In Optics" (Roberts and Company Publishers, Chapter 5, U.S.A.), which is hereinafter abbreviated as Literature B, discloses a method of averaging speckle by moving a diffusing plate.

However, the inventor of the present invention studying the three-dimensional imaging method disclosed in Literature A newly found a problem that noise is generated concentratively on a plane (focal plane) conjugate with the image sensor and this phenomenon affects the acquired refractive index distribution.

Although Literature A points out a similar problem to the above problem that a noise with a fixed pattern is generated in response to change of the incident angle of the object beam to the sample, it fails to describe about the noise generated concentratively on the focal plane.

On the focal plane there is much information on the sample which required by observers, and therefore image degradation on the focal plane is undesirable.

Moreover, the three-dimensional imaging method disclosed in Literature A requires acquisition of the multiple images of the interference fringes, which essentially increases time for data acquisition.

Furthermore, the method of simply equalizing the speckle disclosed in Literature B increases time for imaging, which is not desirable as a noise reduction method.

SUMMARY OF THE INVENTION

The present invention provides a three-dimensional imaging apparatus and a three-dimensional imaging method using digital holography, each of which enables reducing noise generated near a focal plane.

The present invention provides as an aspect thereof an imaging apparatus including an image sensor, an optical system configured to divide a light from a light source by a dividing element into an object beam and a reference beam and configured to cause, through a combining element, the object beam via an object and the reference beam from a reference beam path to interfere with each other to form interference fringes on the image sensor, and a processor. The processor is configured to perform multiple imaging processes to perform imaging of the interference fringes with different incident angles of the object beam to the object, a first process to acquire a transmitted wavefront for each of the incident angles, from each of the multiple interference fringes acquired by the multiple imaging processes, and a second process to calculate a three-dimensional refractive index distribution, from the transmitted wavefronts for the respective incident angles. The apparatus further includes a phase distribution modulator configured to be capable of changing a phase distribution of light in any one of an optical path from the light source to the dividing element, the reference beam path and an optical path from the combining element to the image sensor. The apparatus causes the phase distribution modulator to change the phase distribution in at least one of the multiple imaging processes.

The present invention provides as another aspect thereof an imaging apparatus including an image sensor, an optical system configured to divide a light from a light source by a dividing element into an object beam and a reference beam and configured to cause, through a combining element, the object beam via an object and the reference beam from a reference beam path to interfere with each other to form interference fringes on the image sensor, and a processor. The processor is configured to perform multiple imaging processes to perform imaging of the interference fringes with different incident angles of the object beam to the object, a first process to acquire a transmitted wavefront for each of the incident angles, from each of the multiple interference fringes acquired by the multiple imaging processes, and a second process to calculate a three-dimensional refractive index distribution, from the transmitted wavefronts for the respective incident angles. The apparatus further comprises an aberration modulator configured to be capable of changing aberration of the optical system. The apparatus causes the aberration modulator to change the aberration in at least one of the multiple imaging processes and performs calculation for correcting the aberration in one of the first and second processes.

The present invention provides as yet another aspect thereof an imaging apparatus including an image sensor, and an optical system configured to divide a light from a light source by a dividing element into an object beam and a reference beam and configured to cause, through a combining element, the object beam via an object and the reference beam from a reference beam path to interfere with each other to form interference fringes on the image sensor, and a processor. The processor is configured to perform multiple imaging processes to perform imaging of the interference fringes with different incident angles of the object beam to the object, a first process to acquire a transmitted wavefront for each of the incident angles, from each of the multiple interference fringes acquired by the multiple imaging processes, and a second process to calculate a three-dimensional refractive index distribution, from the transmitted wavefronts for the respective incident angles. The apparatus performs calculation for correcting a known aberration of the optical system in one of the first and second processes.

The present invention provides as still another aspect thereof an imaging method using an optical system configured to divide a light from a light source by a dividing element into an object beam and a reference beam and configured to cause, through a combining element, the object beam via an object and the reference beam from a reference beam path to interfere with each other to form interference fringes on an image sensor. The method includes performing multiple imaging processes to perform imaging of the interference fringes with different incident angles of the object beam to the object, performing a first process to acquire a transmitted wavefront for each of the incident angles, from each of the multiple interference fringes acquired by the multiple imaging processes, and performing a second process to calculate a three-dimensional refractive index distribution, from the transmitted wavefronts for the respective incident angles. A phase distribution of light in any one of an optical path from the light source to the dividing element, the reference beam path and an optical path from the combining element to the image sensor is changed in at least one of the multiple imaging processes.

The present invention provides as further another aspect thereof an imaging method using an optical system configured to divide a light from a light source by a dividing element into an object beam and a reference beam and configured to cause, through a combining element, the object beam via an object and the reference beam from a reference beam path to interfere with each other to form interference fringes on an image sensor. The method includes performing multiple imaging processes to perform imaging of the interference fringes with different incident angles of the object beam to the object, performing a first process to acquire a transmitted wavefront for each of the incident angles, from each of the multiple interference fringes acquired by the multiple imaging processes, and performing a second process to calculate a three-dimensional refractive index distribution, from the transmitted wavefronts for the respective incident angles. Aberration of the optical system is changed in at least one of the multiple imaging processes, and calculation for correcting the aberration is performed in one of the first and second processes.

The present invention provides as still further another aspect thereof an imaging method using an optical system configured to divide a light from a light source by a dividing element into an object beam and a reference beam and configured to cause, through a combining element, the object beam via an object and the reference beam from a reference beam path to interfere with each other to form interference fringes on an image sensor. The method includes performing multiple imaging processes to perform imaging of the interference fringes with different incident angles of the object beam to the object, performing a first process to acquire a transmitted wavefront for each of the incident angles, from each of the multiple interference fringes acquired by the multiple imaging processes, and performing a second process to calculate a three-dimensional refractive index distribution, from the transmitted wavefronts for the respective incident angles. Calculation for correcting a known aberration of the optical system is performed in one of the first and second processes.

Other aspects of the present invention will be apparent from the embodiments described below with reference to the drawings.

BRIEF DESCRIPTION OF THE DRAWINGS

FIGS. 4A to 4C show three-dimensional refractive index distributions in a case where a reference beam has speckle.

FIGS. 5A to 5C show three-dimensional refractive index distributions acquired in Embodiment 1.

FIGS. 11A to 11C show three-dimensional refractive index distributions acquired in Embodiment 4.

DESCRIPTION OF THE EMBODIMENTS

Exemplary embodiments of the present invention will be described below with reference to the accompanied drawings.

Figure 1:
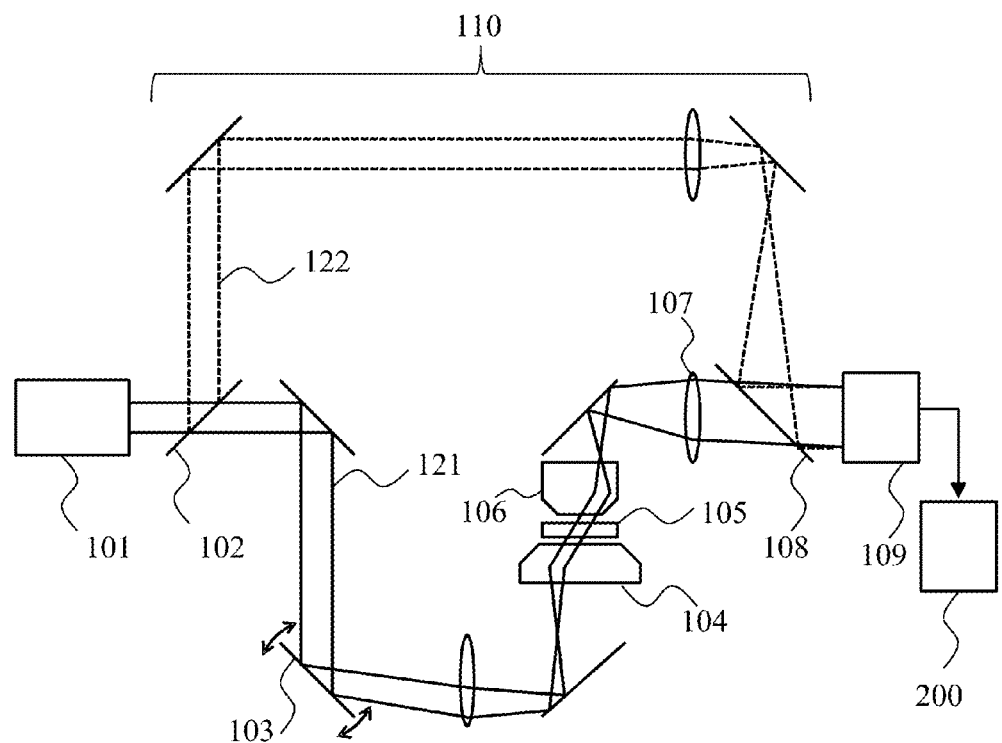
FIG. 1 shows a basic configuration of a digital holography three-dimensional imaging apparatus common to Embodiments 1 to 4 of the present invention.

First, description will be made of common matters to specific embodiments (Embodiments 1 to 4) described below. Each embodiment physically or numerically changes a phase of a reference beam included in a transmitted wavefront to be calculated, for each of different incident angles of the reference beam to an object (sample), and thereby reduces noise generated near a focal plane. FIG. 1 shows a basic configuration of an optical system (hereinafter referred to as an imaging optical system) of a digital holography three-dimensional imaging apparatus to which a noise reduction method explained in each embodiment is applied. The imaging apparatus employs a so-called off-axis imaging optical system in which the reference beam and an object beam enter an image sensor at mutually different incident angles.

A laser light from a laser light source 101 is divided by a beam splitter 102 as a dividing element (optical path dividing element) 102 into a reference beam 122 and an object beam 121. The object beam 121 is reflected by a galvanomirror 103 and projected through a condenser lens 104 to a sample 105 as an object. The galvanomirror 103 is disposed on a plane conjugate with the sample 105. Changing angle of the galvanomirror 103 changes an incident angle of the object beam 121 to the sample 105. The object beam 121 via (that is, transmitted through) the sample 105 reaches an image sensor 109 after being transmitted through an objective lens 106, a relay lens 107 and a beam splitter as a combining element (optical path combining element) 108.

On the other hand, the reference beam 122 passes through a reference optical path 110 and is then introduced via (that is, by being reflected by) the beam splitter 108 to a same optical path as that of the object beam 121 after passing through the sample 105 to reach the image sensor 109. The object beam 121 and the reference beam 122 interfere with each other on an imaging surface of the image sensor 109 to form interference fringes. These interference fringes are converted into a digital signal (digital image) by imaging (photoelectric conversion) of the image sensor 109, and the digital signal is stored as data of the interference fringes in a processor (computer) C. The stored data of the interference fringes is hereinafter referred to as "hologram data". Each embodiment performs multiple imaging processes (or imaging operations) with changing an incident angle of the object beam 121 (hereinafter simply referred to as "an object beam incident angle), that is, with different object beam incident angles to the sample 105 and thereby acquires multiple hologram data (images).

The processor 200 acquires transmitted wavefronts from the respective multiple hologram data and then calculates a three-dimensional refractive index distribution. Although various calculating methods of the transmitted wavefront exist, each embodiment employs a method using a Fast Fourier Transform (FFT). Specifically, the processor 200 first performs the FFT on the hologram data to acquire a spatial spectrum of the hologram data.

Next, the processor 200 extracts, from the acquired spatial spectrum, a spatial spectrum of a real image (also referred to as "a real image spectrum") to acquire a spatial spectrum of a wavefront transmitted through the sample 105. Moreover, the processor 200 shifts the entire wavefront spatial spectrum such that a peak of the wavefront spatial spectrum becomes an origin to remove an influence of oblique incidence of the object beam 121 to the sample 105. In this process, providing an adequate phase distribution to the wavefront spatial spectrum enables correcting aberration of the imaging optical system and an imaging position of the sample 105. Then, the processor 200 performs an inverse FFT on the shifted wavefront spatial spectrum to calculate a transmitted wavefront. This process is hereinafter referred to as "a wavefront reconstruction process" (or simply as "wavefront reconstruction"). The processor 200 performs the wavefront reconstruction on all the hologram data acquired with different incident angles of the object beam 121 to calculate the transmitted wavefronts for all the incident angles.

Although various methods of calculating a three-dimensional refractive index distribution from multiple transmitted wavefronts also exist, each embodiment uses a backpropagation method based on a Rytov approximation. In the backpropagation method, the processor 200 first acquires a logarithm of the transmitted wavefront, that is, a phase distribution and then calculates a spatial spectrum thereof. Thereafter, the processor 200 multiplies the calculated spatial spectrum by a proper coefficient and then applies the spectrum after the multiplication on an Ewald sphere whose radius is $n_e/\lambda$ and whose center position is $(-f_{x0}, -f_{y0}, -f_{z0})$ in a spatial frequency space. In the Ewald sphere, $n_e$ represents a refractive index of a medium, $\lambda$ represents a wavelength of the laser light, and $f_{x0}$, $f_{y0}$ and $f_{z0}$ represent spatial frequencies of the object beam entering the sample 105.

The processor 200 performs this process on all the transmitted wavefronts and calculates a sum of all the acquired Ewald spheres to acquire a three-dimensional spatial spectrum of a refractive index distribution. Then, the processor 200 performs an inverse FFT on the three-dimensional spatial spectrum to calculate the three-dimensional refractive index distribution. In this process, using an inverse filter or the like enables sharpening the refractive index distribution. Calculating the three-dimensional refractive index distribution from the multiple transmitted wavefronts by the above processes is hereinafter referred to as "a three-dimensional reconstruction process" (or simply "three-dimensional reconstruction"). Hologram data is generally acquired by using light having high coherency, such as laser light. The light having high coherency generates therein a random phase distribution by defects of an optical element that this light enters, surface coarseness of the optical element and the like. Such a random phase distribution changes an originally uniform illuminance distribution into a nonuniform illuminance distribution. As mentioned above, such a nonuniform illuminance distribution is called speckle or speckle noise, which causes degradation of the Hologram data to be acquired and further causes degradation of the three-dimensional refractive index distribution to be finally acquired.

The speckle is changed in its distribution by variation of the phase distribution of the light accompanying change in propagation condition of the light or change in optical element. The reference beam and the object beam each have the speckle. Since each change in the incident angle of the object beam changes an optical path length through which the object beam passes and an incident position of the object beam to the optical element, the distribution of the speckle of the object beam is changed according to the incident angle of the object beam. However, since the reference beam always passes through in a fixed optical path during imaging, the distribution of the speckle of the reference beam is not changed. As a result, the hologram data will always have a fixed speckle irrespective of the incident angle of the object beam. This means that the fixed speckle independent of the incident angle of the object beam is added to the transmitted wavefront acquired as a result of the wavefront reconstruction.

Moreover, when the transmitted wavefront has such a fixed speckle independent of the incident angle of the object beam, the three-dimensional refractive index distribution acquired as a result of the three-dimensional reconstruction includes noise concentratively on a plane conjugate with the image sensor. The reason is as follows. The above-described three-dimensional reconstruction can be roughly divided into a first step where the spatial spectrum of each phase distribution is applied on the Ewald sphere and a second step where the Ewald spheres calculated for the respective incident angles are summed. The first step can be considered in a real space as a process to cause the phase distribution to propagate in a direction of incidence. On the plane conjugate with the image sensor, the data is not changed by this process, so that the fixed speckle included in the transmitted wavefront also has a same distribution irrespective of the incident angle of the object beam.

However, in a region other than the plane conjugate with the image sensor, the propagation of the phase distribution in the direction of incidence causes the speckle to have different distributions depending on the incident angles of the object beam.

On the other hand, the second step can be considered as a process where the respective propagated phase distributions are integrated. This process integrates the speckles having the different distributions in the region other than the plane conjugate with the image sensor, which results in a reduction of the speckle. However, since on the plane (focal plane) conjugate with the image sensor the speckle has the same distribution irrespective of the incident angle of the object beam, even integration thereof does not reduce the speckle. Thus, the phenomenon occurs that the speckle is generated concentratively only near the focal plane. Such a speckle noise is hereinafter referred to as "a focal noise".

The focal noise is generated due to the fact that the speckle of the reference beam is always fixed irrespective of the incident angle of the object beam. Therefore, in order to reduce the focal noise, it is enough to provide a change in phase of the reference beam when the incident angle of the object beam is changed so as to change the distribution of the speckle. This process can be realized by, for example, disposing a light diffuser such as a diffuser which diffuses light entering the reference beam path 110 and moving the diffuser according to the change of the incident angle of the object beam. Alternatively, this process can be also realized by changing the optical path length of the reference beam path 110 by inserting and removing an element such as a glass parallel plate which is capable of changing an optical path length into and from the reference beam path 110. In addition, this process can be also realized by, for example, changing the reference beam path 110 itself by changing angle or position of a mirror disposed on the reference beam path 110.

However, these methods are specific examples of means for changing the distribution of the speckle. Essentially, it is only necessary to dispose a phase distribution modulator capable of changing a phase distribution of light in the reference beam path 110 and to change, by using this modulator, the distribution of the speckle (hereinafter referred to as "a speckle distribution") in the reference beam with the change of the incident angle of the object beam.

Furthermore, the distribution of the speckle may be changed by other methods. As described above, each embodiment performs calculation processes such as the wavefront reconstruction process and the three-dimensional reconstruction process. Therefore, the speckle distribution in the reference beam may be changed in a subsequent numerical calculation. This can be realized by moving the sample according to the change of the incident angle of the object beam and numerically correcting its position. For example, this method moves the sample to different positions in an optical axis direction for the respective incident angles of the object beam. With the movement of the sample, an optical image of the sample is moved, but the speckle distribution in the reference beam is not changed because the reference beam path is not changed.

In the digital holography, the transmitted wavefront can be converted by the subsequent calculation into a wavefront at an arbitrary imaging position, so that it is possible to calculate, from the acquired transmitted wavefronts, transmitted wavefronts at a same imaging position. Since this calculation is performed on the acquired transmitted wavefront, that is, on the wavefront including the speckle in the reference beam, the speckle distribution in the reference beam is also simultaneously changed. This change is equivalent to changing the phase distribution of the reference beam with the change of the incident angle of the reference beam. Thus, as mentioned above, subsequently performing the three-dimensional reconstruction process enables reducing the focal noise.

Moving the sample is equivalent to providing a wavefront aberration to the imaging optical system. For example, moving the sample in a lateral direction provides thereto a tilt aberration, and moving the sample in the optical axis direction provides thereto a defocus aberration. Therefore, the above-described method can be considered as being equivalent to providing different aberrations to the imaging optical system for the respective incident angles of the object beam and numerically performing an aberration correction in the wavefront reconstruction. Accordingly, providing to the imaging optical system an aberration modulator (optical element) capable of changing its aberration, changing the aberration with the change of the incident angle of the object beam by the aberration modulator and then performing the aberration correction in the wavefront reconstruction or the three-dimensional reconstruction can also reduce the focal noise. As long as any aberration is provided to the imaging optical system, it is not necessary to change the aberration with the change of the incident angle of the object beam. This is because changing the incident angle of the object beam causes a diffracted light of the transmitted wavefront to pass through different positions in the objective lens 106 and therefore changes the aberration received by the transmitted wavefront. Consequently, providing such an aberration that its value changes in a pupil plane of the imaging optical system, for example, astigmatism and correcting it in the wavefront reconstruction enables reducing the focal noise.

Each embodiment employs a specific means that, in essence, changes the incident angle of the object beam and physically or numerically changes the phase of the reference beam to reduce the focal noise and thereby provide a highly accurate three-dimensional refractive index distribution.

The method disclosed in Literature B averages the speckle for one incident angle, which increases time for exposure and number of imaging times. In contrast, each embodiment does not cause such a problem.

Embodiment 1

Figure 2:
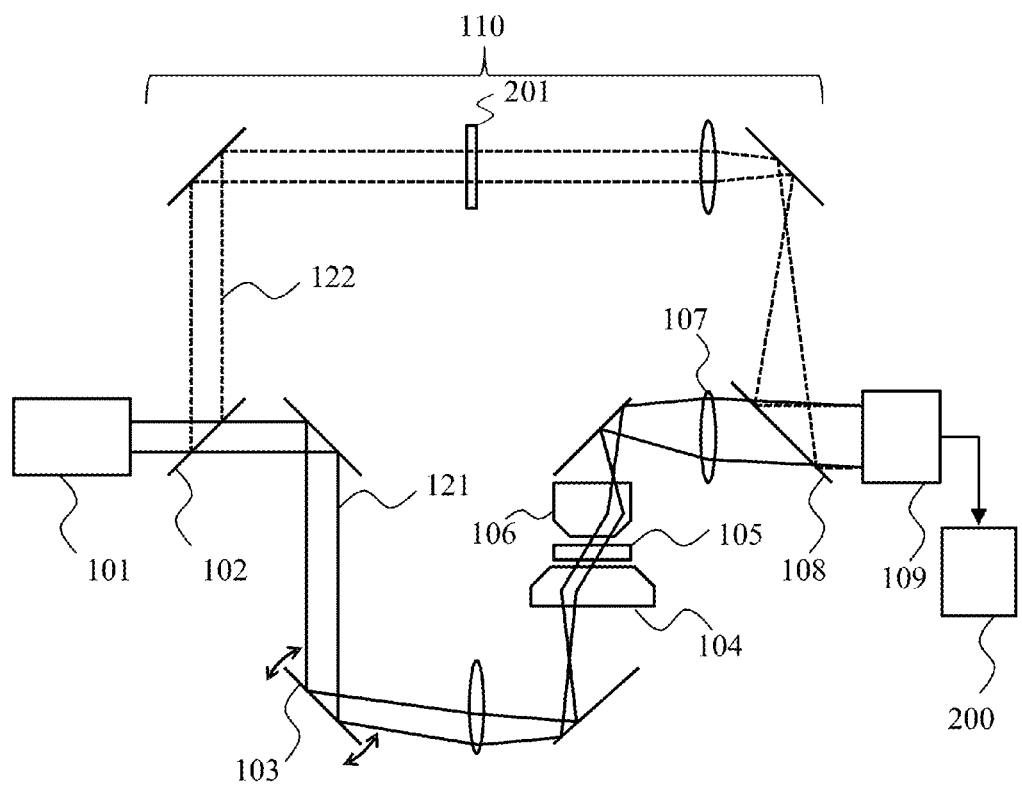
FIG. 2 shows a configuration of the imaging apparatus of Embodiment 1.

Description will be made of a noise reduction method (imaging method) that is a first embodiment (Embodiment 1) of the present invention. FIG. 2 shows a configuration of an imaging optical system in a case of applying the noise reduction method of Embodiment 1 to the imaging apparatus shown in FIG. 1. In FIG. 2, constituent elements shown in FIG. 1 are denoted by same reference numerals. This embodiment disposes a diffuser 201 in the reference beam path 110, rotates a galvanomirror 103 and moves the diffuser 201 as the above-mentioned phase distribution modulator in a direction orthogonal to an optical axis of the reference beam path 110. This configuration changes the incident angle of the object beam 121 to the sample 105, changes the phase of the reference beam 122 and thereby changes the speckle distribution. The direction in which the diffuser 201 is moved is not limited to the direction orthogonal to the optical axis of the reference beam path 110 and may be in a direction along the optical axis. The diffuser 201 may be rotated about the optical axis.

Figure 3:
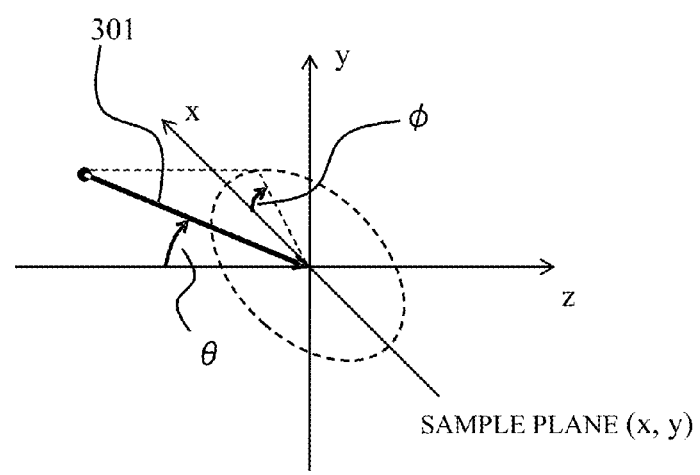
FIG. 3 shows definition of an incident angle in Embodiment 1.

A simulated noise reduction effect of this embodiment will be described. First, as a definition of coordinates, as shown in FIG. 3, an optical axis of the imaging optical system is defined as a z axis, and two axes orthogonal to the optical axis (z axis) and orthogonal to each other are defined as an x-axis and a y-axis. A definition of the incident angle of the object beam to the sample will be explained with reference to FIG. 3.

In FIG. 3, reference numeral 301 denotes a direction in which the object beam enters the sample. An angle formed between a direction of the object beam and the z axis is represented by $\theta$, and an angle formed between a projected direction given by projecting the direction onto an x-y plane and the x axis is represented by $\phi$, which are both referred to as "the incident angle".

In the simulation, a laser whose wavelength $\lambda$ is 543 nm was used as the light source, a numerical aperture (NA) of the imaging optical system was set to 1.4, an image-forming magnification of the imaging optical system was set to 1, and the incident angle $\theta$ of the object beam was fixed at 50 degrees. Hologram data were calculated for cases where the sample was illuminated from 120 directions by changing the incident angle $\phi$ at 3 degrees intervals from 0 to 360 degrees. As the sample, a polystyrene bead having a diameter of 10 μm and a refractive index of 1.597 and dipped in an oil having a refractive index of 1.575 was used. An extraction region where a real image spectrum is extracted in the wavefront reconstruction was set to a circular region centered at a spatial frequency decided by the incident angle and having a radius (numerical value NA) of 0.7.

In order to imitate the random phase distribution of the reference beam, a Gaussian noise whose mean value m is 0 rad and whose standard deviation $\sigma$ is 0.3 rad is added to the phase of the reference beam. The Gaussian noise is a Gaussian random number in which an appearance frequency P(i) of a noise value i at each point is according to a Gaussian distribution whose standard deviation is $\sigma$ and whose mean value is m.

First, FIG. 4A to 4C show three-dimensional refractive index distributions calculated as simulation results in a case where the phase distribution of the reference beam is fixed in the respective imaging processes. FIG. 4A shows an x-y section passing through a center of the bead, FIG. 4B shows an x-y section passing through a 2 μm-lower part of the bead (z=2 μm), and FIG. 4C shows an x-z section passing through the center of the bead. Although noise is observed in FIG. 4A, this noise is not observed in FIG. 4B. As understood from FIG. 4C, the noise is generated concentratively near the focal plane.

In order to show the effect of this embodiment, the incident angle of the object beam was changed, and the noise added to the phase of the reference beam was changed. The added noise was the above-mentioned Gaussian noise whose mean value m is 0 rad and whose standard deviation $\sigma$ is 0.3 rad.

FIG. 5A to 5C show the calculated three-dimensional refractive index distributions. FIG. 5A shows the x-y section passing through the center of the bead, FIG. 5B shows the x-y section passing through the 2 μm-lower part of the bead (z=2 μm), and FIG. 5C shows the x-z section passing through the center of the bead. As understood by comparison of FIGS. 5A and 4A, the noise generated in FIG. 4A is reduced in FIG. 5A. Moreover, in FIG. 5B only a noise of a same level as that in FIG. 4B is generated. Furthermore, as understood from FIG. 5C, the phenomenon that the noise is generated concentrically near the focal plane is not caused. This simulation result shows that changing the speckle distribution of the reference beam 122 by using the diffuser 201 with the change of the incident angle of the object beam 121 reduces the focal noise.

Although this embodiment described the method of changing the phase of the reference beam 122 by using the diffuser 201, other method may be used. For example, as mentioned above, the method may be used which inserts and remove the glass parallel plate into and from the reference beam path 110 to change its optical path length. Alternatively, the method may be used which changes the angle or position of the mirror disposed in the reference beam path 110 to change the reference beam path 110 itself.

Moreover, although this embodiment described the method using the diffuser 201 disposed in the reference beam path 110, such a diffuser may be disposed at other positions. For example, the diffuser may be disposed between the light source 101 and the beam splitter 102, or between the beam splitter 108 and the image sensor 109. It is desirable to dispose the diffuser at a pupil position of the imaging optical system or at a plane conjugate therewith.

Embodiment 2

Figure 6:
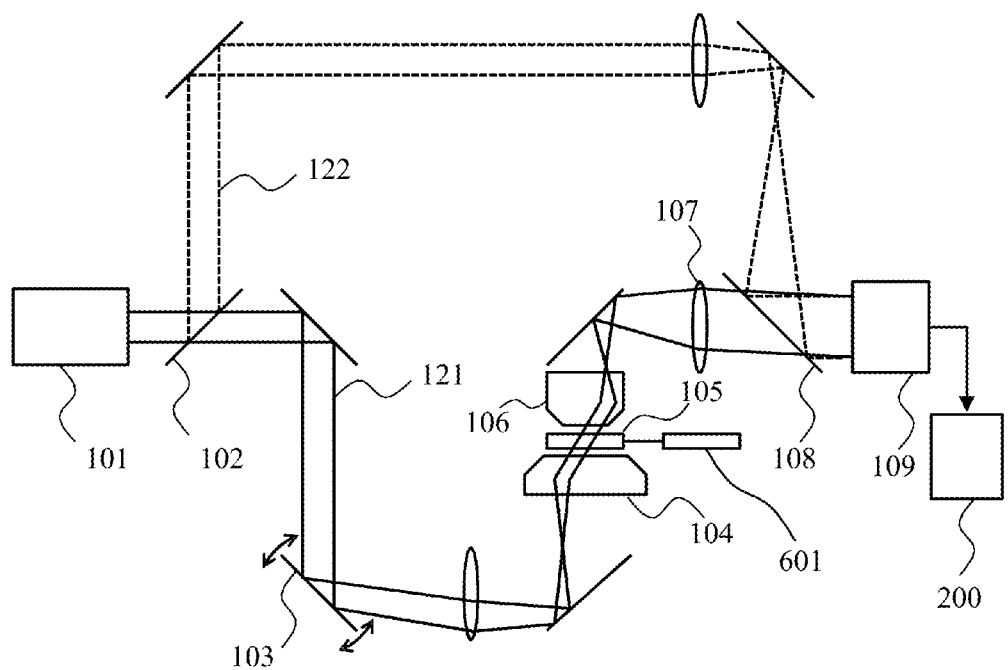
FIG. 6 shows a configuration of the imaging apparatus of Embodiment 2.

Next, description will be made of a noise reduction method (imaging method) that is a second embodiment (Embodiment 2) of the present invention. FIG. 6 shows a configuration of an imaging optical system in a case of applying the noise reduction method of Embodiment 2 to the imaging apparatus shown in FIG. 1. In FIG. 6, constituent elements shown in FIG. 1 are denoted by same reference numerals. This embodiment includes a driver 601 to move a stage on which the sample 105 is placed. Rotating the galvanomirror 103 and moving the stage by the driver 601 in an optical axis direction (z direction) of an optical path of the object beam 121, that is, moving the sample 105 changes the incident angle of the object beam 121 and the imaging position of the sample 105. This embodiment saves a change amount of the imaging position together with the hologram data and numerically corrects the imaging position in the wavefront reconstruction.

A simulated noise reduction effect of this embodiment will be described. Calculation conditions other than the imaging position of the sample and the noise given to the reference beam were the same as those in Embodiment 1. In the simulation of this embodiment, with the change of the incident angle of the object beam, the imaging position of the sample in the z direction was changed at 0.2 μm intervals from −12 μm to 12 μm. Removal of a defocus aberration corresponding to this z-directional position was made in the wavefront reconstruction to numerically correct a focus position. A noise independent of the incident angle was added to the phase of the reference beam. The added noise was the above-mentioned Gaussian noise whose mean value m is 0 rad and whose standard deviation $\sigma$ is 0.3 rad.

Figures 7A, 7B, 7C:
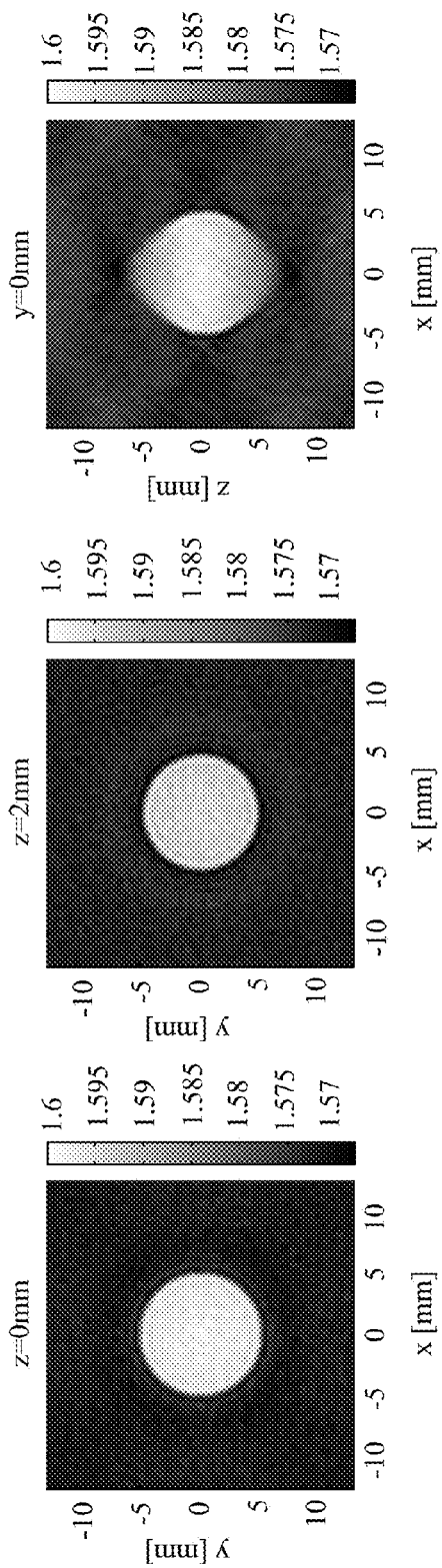
FIGS. 7A to 7C show three-dimensional refractive index distributions acquired in Embodiment 2.

FIG. 7A to 7C show three-dimensional refractive index distributions calculated as simulation results. FIG. 7A shows an x-y section passing through the center of the bead, FIG. 7B shows an x-y section passing through the 2 μm-lower part of the bead (z=2 μm), and FIG. 7C shows an x-z section passing through the center of the bead. As understood by comparison of FIGS. 7A and 4A, the noise generated in FIG. 4A is reduced in FIG. 7A. Moreover, in FIG. 7B only a noise of a same level as that in FIG. 4B is generated. Furthermore, as understood from FIG. 7C, the phenomenon that the noise is generated concentrically near the focal plane is not caused. This simulation result shows that changing the position of the sample 105 with the change of the incident angle of the object beam 121 and then numerically correcting the changed position thereof reduces the focal noise.

Although this embodiment described the case of including the driver 601 that moves the stage on which the sample 105 is placed to change the position of the sample 105, a driver may be alternatively provided which changes position of the image sensor 109 or that of the imaging optical system.

In addition, although this embodiment described the case of moving the sample 105 only in the z direction, the sample 105 may be moved in the x and/or y direction instead of the z direction, or in the x and/or y direction and the z direction. The sample 105 may be tilted or rotated.

Embodiment 3

Figure 8:
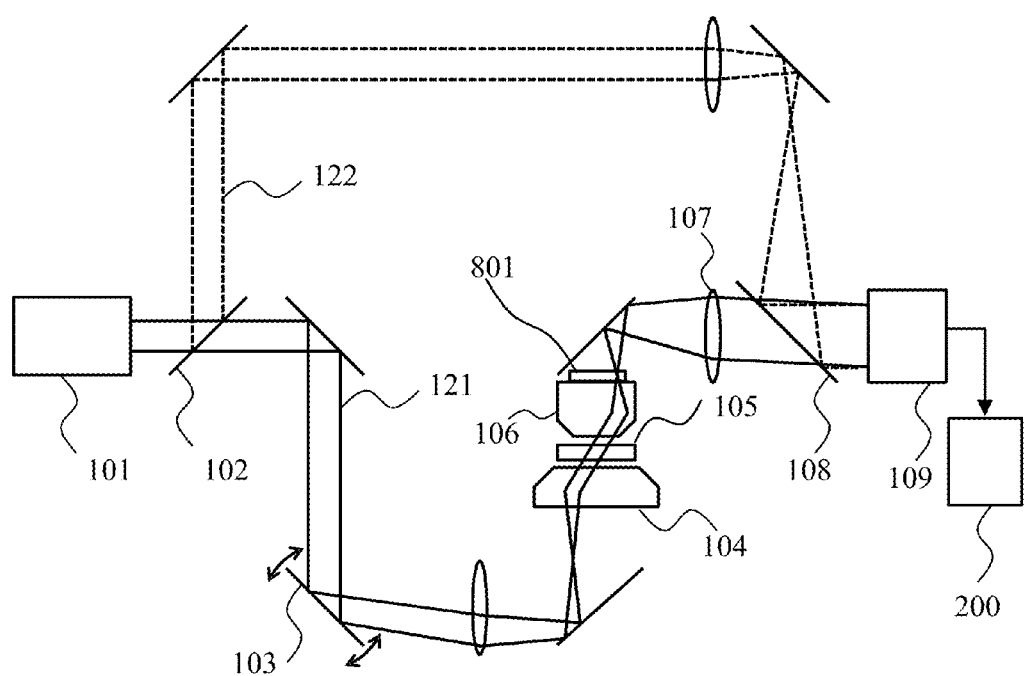
FIG. 8 shows a configuration of the imaging apparatus of Embodiment 3.

Next, description will be made of a noise reduction method (imaging method) that is a third embodiment (Embodiment 3) of the present invention. FIG. 8 shows a configuration of an imaging optical system in a case of applying the noise reduction method of Embodiment 3 to the imaging apparatus shown in FIG. 1. In FIG. 8, constituent elements shown in FIG. 1 are denoted by same reference numerals. This embodiment provides a spatial modulator 801 as the above-mentioned aberration modulator at a pupil position of the objective lens 106. Rotating the galvanomirror 103 and changing amount of spatial modulation of the spatial modulator 801 changes the incident angle of the object beam and also changes aberration of the imaging optical system. This embodiment saves the aberration together with the hologram data and numerically corrects the aberration in the wavefront reconstruction.

A simulated noise reduction effect of this embodiment will be described. Calculation conditions other than aberration given to the imaging optical system and the noise given to the reference beam were the same as those in Embodiment 1. In the simulation of this embodiment, with the change of the incident angle of the object beam, amount of astigmatism given to the imaging optical system was changed. The astigmatism is expressed by following expression (1) when pupil coordinates are represented by $(\rho_x, \rho_y)$.

$$W = \frac{C}{\sqrt{6}}(\rho_x^2 - \rho_y^2) \quad (1)$$

where C represents a constant that was changed at π/15 intervals from −4π to 4π. This aberration was numerically removed in the wavefront reconstruction, and a noise independent of the incident angle was added to the phase of the reference beam. The added noise was the above-mentioned Gaussian noise whose mean value m is 0 rad and whose standard deviation σ is 0.3 rad.

Figures 9A, 9B, 9C:
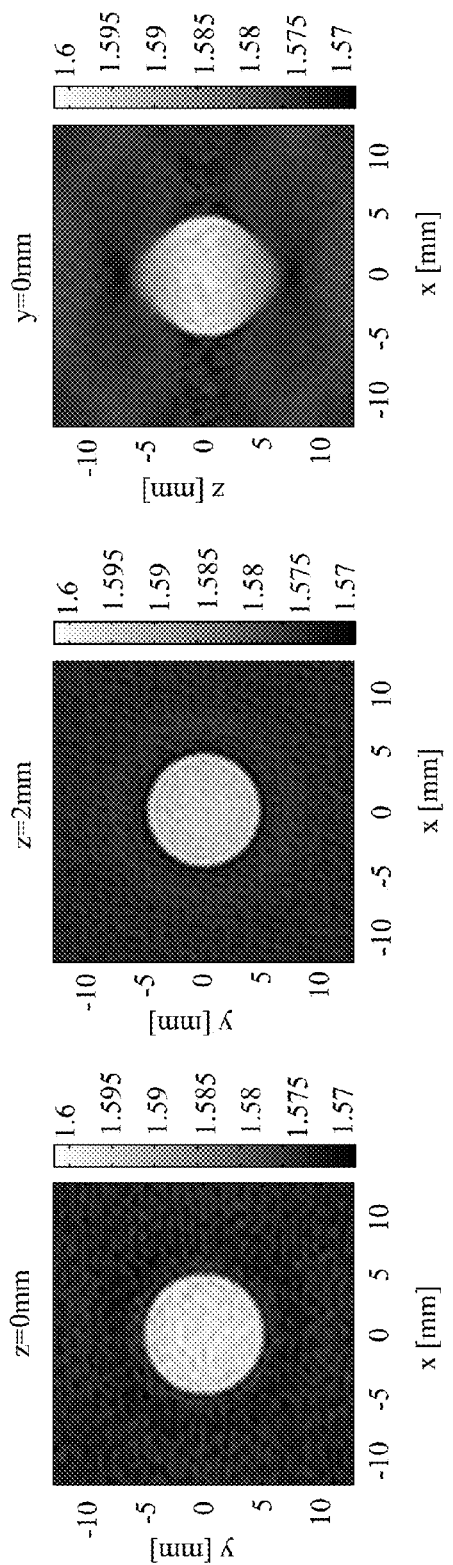
FIGS. 9A to 9C show three-dimensional refractive index distributions acquired in Embodiment 3.

FIG. 9A to 9C show three-dimensional refractive index distributions calculated as simulation results. FIG. 9A shows an x-y section passing through the center of the bead, FIG. 9B shows an x-y section passing through the 2 μm-lower part of the bead (z=2 μm), and FIG. 9C shows an x-z section passing through the center of the bead. As understood by comparison of FIGS. 9A and 4A, the noise generated in FIG. 4A is reduced in FIG. 9A. Moreover, in FIG. 9B only a noise of a same level as that in FIG. 4B is generated.

Furthermore, as understood from FIG. 9C, the phenomenon that the noise is generated concentrically near the focal plane is not caused. This simulation result shows that changing the aberration with the change of the incident angle of the object beam 121 and then numerically correcting the changed aberration reduces the focal noise.

Although this embodiment described the case of giving the astigmatism to the imaging optical system, other aberrations, such as spherical aberration and coma aberration may be given thereto.

Moreover, although this embodiment used the spatial modulator in order to give the aberration to the imaging optical system, other aberration modulator may be used to give the aberration thereto. For example, changing arrangement of lenses included in the imaging optical system or interchanging a pupil filter for each of the imaging processes can change the aberration.

Embodiment 4

Figure 10:
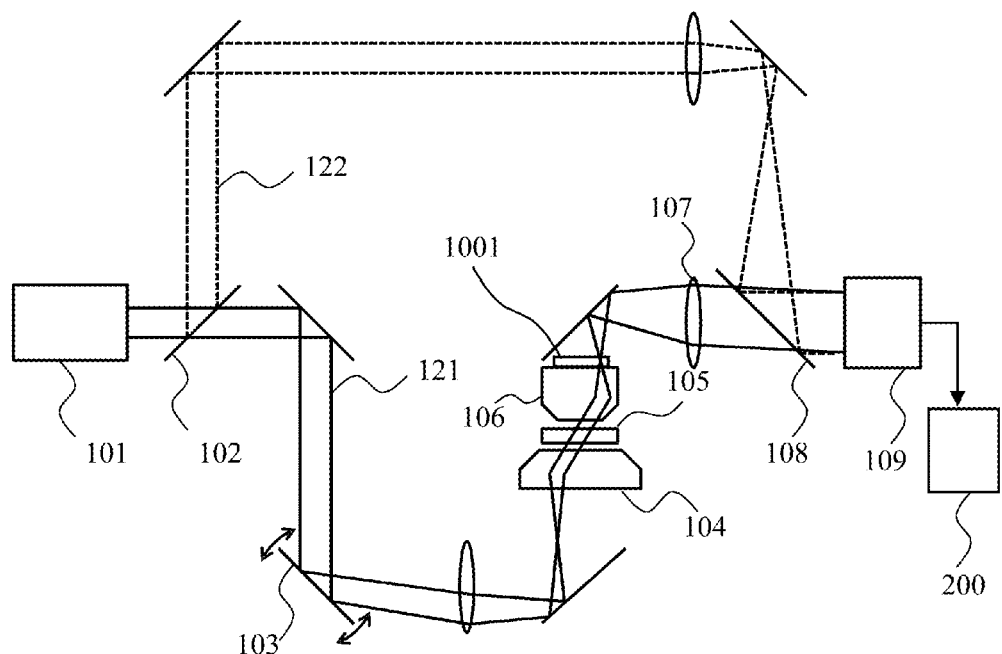
FIG. 10 shows a configuration of the imaging apparatus of Embodiment 4.

Next, description will be made of a noise reduction method (imaging method) that is a fourth embodiment (Embodiment 4) of the present invention. FIG. 10 shows a configuration of an imaging optical system in a case of applying the noise reduction method of Embodiment 4 to the imaging apparatus shown in FIG. 1. In FIG. 10, constituent elements shown in FIG. 1 are denoted by same reference numerals. This embodiment includes a pupil filter 1001 disposed at a pupil position of the objective lens 106. This embodiment stores beforehand data of an aberration given by this pupil filter in a computer and numerically corrects the aberration in the wavefront reconstruction. In other words, a calculation of a known aberration that the imaging optical system has is performed.

A simulated noise reduction effect of this embodiment will be described. Calculation conditions other than the aberration given to the imaging optical system and the noise given to the reference beam were the same as those in Embodiment 1. In the simulation of this embodiment, an astigmatism expressed by expression (1) (C=4π) shown in Embodiment 3 was given to the imaging optical system, and this aberration was numerically removed in the wavefront reconstruction. A noise independent of the incident angle was added to the phase of the reference beam. The added noise was the above-mentioned Gaussian noise whose mean value m is 0 rad and whose standard deviation σ is 0.3 rad.

FIG. 11A to 11C show three-dimensional refractive index distributions calculated as simulation results. FIG. 11A shows an x-y section passing through the center of the bead, FIG. 11B shows an x-y section passing through the 2 μm-lower part of the bead (z=2 μm), and FIG. 11C shows an x-z section passing through the center of the bead. As understood by comparison of FIGS. 11A and 4A, the noise generated in FIG. 4A is reduced in FIG. 11A. Moreover, in FIG. 11B only a noise of a same level as that in FIG. 4B is generated. Furthermore, as understood from FIG. 11C, the phenomenon that the noise is generated concentrically near the focal plane is not caused. This simulation result shows that giving the aberration to the imaging optical system and then numerically correcting the aberration reduces the focal noise.

Although this embodiment described the case where the pupil filter has astigmatism, the pupil filter may have aberrations other than astigmatism, such as spherical aberration and coma aberration.

Moreover, although this embodiment described the case of giving the aberration to the imaging optical system by using the pupil filter, moving a lens included in the imaging optical system can give the aberration thereto. Alternatively, an aberration may be provided beforehand to the objective lens. In addition, a spatial modulator may be used.

Although each of the above embodiments described the imaging apparatus provided with the off-axis imaging optical system, a phase shift hologram that produces a wavefront from data of multiple interference fringes obtained through mutually different optical path lengths of the reference beam.

Moreover, each of the above embodiments described the case of changing, in the multiple imaging processes performed with the mutually different incident angles of the object beam, the phase distribution of the reference beam for the respective incident angles (that is, for the respective imaging processes). However, changing the phase distribution of the reference beam (for example, moving the diffuser described in Embodiment 1 or inserting and removing the parallel plate described in Embodiment 2) at least one of the multiple imaging processes relative to the other thereof is enough for providing the noise reduction effect.

Furthermore, although each of the above embodiments described the case of performing the calculation for correcting the position of the sample or the aberration in the wavefront reconstruction, this calculation may be performed in the three-dimensional reconstruction.

In addition, although each of the above embodiments described the case of using an image hologram that produces the interference fringes for the image of the sample, a Fourier hologram that acquires a distribution of diffracted light of a transmitted wavefront through the sample may be used.

Each of the above embodiments can sufficiently reduce the noise that appears near the focal plane in performing three-dimensional imaging using digital holography, which enables providing a highly accurate three-dimensional refractive index distribution.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-261940, filed on Dec. 19, 2013, which is hereby incorporated by reference herein in its entirety.

What is claimed is:

1. An imaging apparatus comprising:
   an image sensor;
   an optical system configured to divide a light from a light source, by a dividing element, into an object beam and a reference beam and configured to cause, through a combining element, the object beam via an object and the reference beam from a reference beam path to interfere with each other to form interference fringes on the image sensor;
   a phase distribution modulator; and
   a processor,
   wherein the processor is configured to perform:
      multiple imaging processes to perform imaging of the interference fringes with different incident angles of the object beam to the object;
      a first process to acquire a transmitted wavefront for each of the incident angles, from each of the multiple interference fringes acquired by the multiple imaging processes; and
      a second process to calculate a three-dimensional refractive index distribution, from the transmitted wavefronts for the respective incident angles, and
   wherein the phase distribution modulator is configured to change a phase distribution of the reference beam for at least one of the multiple imaging processes.

2. An imaging apparatus according to claim 1, wherein the phase distribution modulator is a light diffuser.

3. An imaging apparatus according to claim 1, wherein the phase distribution modulator is configured to change an optical path of the reference beam or an optical path length thereof.

4. An imaging apparatus according to claim 1, wherein the apparatus causes the phase distribution modulator to change the phase distribution in each of the multiple imaging processes.

5. An imaging apparatus according to claim 1, wherein the phase distribution modulator is configured to change the phase distribution of the reference beam so as to reduce a focal noise.

6. An imaging apparatus according to claim 1, wherein the phase distribution modulator is configured to change the phase distribution of the reference beam in each of the incident angles of the object beam to the object.

7. An imaging method using an optical system configured to divide a light from a light source by a dividing element into an object beam and a reference beam and configured to cause, through a combining element, the object beam via an object and the reference beam from a reference beam path to interfere with each other to form interference fringes on an image sensor, the method comprising:
   performing multiple imaging processes to perform imaging of the interference fringes with different incident angles of the object beam to the object;
   performing a first process to acquire a transmitted wavefront for each of the incident angles, from each of the multiple interference fringes acquired by the multiple imaging processes; and
   performing a second process to calculate a three-dimensional refractive index distribution, from the transmitted wavefronts for the respective incident angles,
   wherein a phase distribution of the reference beam is changed for at least one of the multiple imaging processes.

8. An imaging method according to claim 7, wherein the phase distribution of the reference beam is changed so as to reduce a focal noise.

9. An imaging method according to claim 7, wherein the phase distribution of the reference beam is changed in each of the incident angles of the object beam to the object.

* * * * *